(12) United States Patent
Subramanian et al.

(10) Patent No.: US 12,177,204 B2
(45) Date of Patent: Dec. 24, 2024

(54) CERTIFICATE AUTHORITY SELECTION IN A CLOUD PROVIDER NETWORK

(71) Applicant: Amazon Technologies, Inc., Seattle, WA (US)

(72) Inventors: Manikandan Subramanian, Seattle, WA (US); Marcel Andrew Levy, Seattle, WA (US); Blake P Hess, Lake Forest Park, WA (US)

(73) Assignee: Amazon Technologies, Inc., Seattle, WA (US)

( * ) Notice: Subject to any disclaimer, the term of this patent is extended or adjusted under 35 U.S.C. 154(b) by 269 days.

(21) Appl. No.: 17/700,281

(22) Filed: Mar. 21, 2022

(65) Prior Publication Data
US 2023/0300124 A1 Sep. 21, 2023

(51) Int. Cl.
*H04L 9/40* (2022.01)

(52) U.S. Cl.
CPC ........ *H04L 63/0823* (2013.01); *H04L 63/107* (2013.01); *H04L 63/20* (2013.01)

(58) Field of Classification Search
CPC .... H04L 63/0823; H04L 63/107; H04L 63/20
See application file for complete search history.

(56) References Cited

U.S. PATENT DOCUMENTS

| | | | |
|---|---|---|---|
| 6,108,788 A * | 8/2000 | Moses | G06F 21/602 713/155 |
| 7,694,142 B2 * | 4/2010 | Saw | H04L 63/0428 705/51 |
| 8,327,128 B1 * | 12/2012 | Prince | H04L 63/0884 713/153 |
| 9,660,817 B2 * | 5/2017 | Saboori | H04L 9/3263 |
| 2002/0073311 A1 | 6/2002 | Futamura et al. | |
| 2004/0177250 A1 | 9/2004 | Westphal et al. | |
| 2007/0118875 A1 | 5/2007 | Chow et al. | |
| 2011/0113239 A1 | 5/2011 | Fu et al. | |
| 2011/0154024 A1 * | 6/2011 | Ignaci | H04L 63/0823 713/156 |
| 2011/0219067 A1 * | 9/2011 | Bernosky | H04L 9/3263 709/203 |

(Continued)

OTHER PUBLICATIONS

Non-Final Office Action, U.S. Appl. No. 17/541,998, Dec. 29, 2023, 27 pages.

(Continued)

*Primary Examiner* — William S Powers
(74) *Attorney, Agent, or Firm* — Nicholson De Vos Webster & Elliott LLP

(57) ABSTRACT

Techniques for certificate authority (CA) selection are described. A certificate management service of a cloud provider network receives a first request to generate a certificate from an electronic device, the first request including an indication of an identity of a user and an identification of a domain name to associate with the certificate. A CA selection policy applicable to the first request is identified, the CA selection policy including a CA selection rule. A CA to generate the certificate is identified by evaluating the CA selection rule, the CA selection rule associates at least a portion of the domain name with the CA. A second request to generate the certificate is sent to the identified CA. The certificate or an identification of the certificate from the CA is returned to the electronic device.

20 Claims, 8 Drawing Sheets

(56) References Cited

U.S. PATENT DOCUMENTS

| | | | |
|---|---|---|---|
| 2014/0281558 A1 | 9/2014 | Dixon | |
| 2015/0222604 A1* | 8/2015 | Ylonen | H04L 9/3263 |
| | | | 713/171 |
| 2019/0245700 A1* | 8/2019 | Dobre | H04L 67/1097 |
| 2020/0052908 A1 | 2/2020 | Thitron et al. | |
| 2021/0352472 A1* | 11/2021 | Ganesan | H04L 63/0272 |
| 2023/0032867 A1 | 2/2023 | Peddada et al. | |

OTHER PUBLICATIONS

"AWS Certificate Manager", Amazon Web Services, Dec. 8, 2015, pp. 1-82, XP093023107.
"AWS Identity and Access Management—part 1", Amazon Web Services, Nov. 27, 2021, pp. 1-878, XP093023105.
"AWS Identity and Access Management—part 2", Amazon Web Services, Nov. 27, 2021, pp. 1-878, XP093023128.
Anonymous: "How CA Certificates Work: Public Key; Security Services", Mar. 28, 2003, XP055088416.
International Search Report and Written Opinion, PCT App. No. PCT/US2022/079150, Feb. 23, 2023, 10 pages.
International Search Report and Written Opinion, PCT App. No. PCT/US2023/015214, Jun. 1, 2023, 10 pages.
Notice of Allowance, U.S. Appl. No. 17/541,998, May 15, 2024, 12 pages.

\* cited by examiner

CERTIFICATE AUTHORITY SELECTION IN A CLOUD PROVIDER NETWORK

BACKGROUND

A certificate refers to a digital document that has been cryptographically secured and can enable secure communications. Certificates are commonly used within a cryptographic system knows as a public key infrastructure (PKI). PKI relies on asymmetric cryptography systems using key pairs—a private key and a public key—to encrypt and decrypt data, digitally sign data, etc. Public keys can be associated with digital certificates that certify the owner of a given public key. The digital certificates are created and signed by a public or private certificate authority which acts as a trusted third party. A typical use case of certificates is the securing of network communications via Secure Sockets Layer (SSL)/Transport Layer Security (TLS), although certificates can be used to for other security purposes such as digitally signing files to ensure that they originated from the holder of the certificate. Certificates may be referred as X.509 certificates (in reference to an industry standard for certificate systems).

BRIEF DESCRIPTION OF DRAWINGS

Various embodiments in accordance with the present disclosure will be described with reference to the drawings, in which.

DETAILED DESCRIPTION

The present disclosure relates to methods, apparatus, systems, and non-transitory computer-readable storage media for certificate authority (CA) selection from multiple CAs when handling certificate-related requests. For example, a certificate management service (CMS) can select the appropriate CA for certificate creation requests (sometimes referred to as "issuing" a certificate). The CMS can be configured with one or more policies that govern the selection of a CA based upon one or more parameters indicated in a request. Upon receipt of a request from a requestor (e.g., a user), the CMS can identify one or more policies applicable to the request and then evaluate the policy or policies to determine from which CA to use to satisfy the request.

In modern cloud-based environments, multiple CAs can exist and offer different services. Some CAs might issue public certificates (e.g., for use in securing communications that traverse a public network such as the internet or are with an entity outside of a user's organization), while other CAs might issue private certificates (e.g., for use in securing communications amongst an organizations internal cloud-hosted resources on a private network or amongst related users). Users often do not know which CA to direct their certificate-related requests. For example, when requesting a new certificate, users often do not know from which CA the certificate must issue and may inadvertently obtain a certificate from the wrong CA. To address these challenges, among others, the CMS CA selection described herein streamlines the process of certificate-related requests for users in cloud-based environments. Among other benefits, the CMS CA selection increases the speed at which users can obtain new certificates, reduces errors in the issuance of certificates, and reduces the administrative burden of communicating the appropriate CA(s) for certain certificate requests or types of certificate requests to users.

Figure 1:
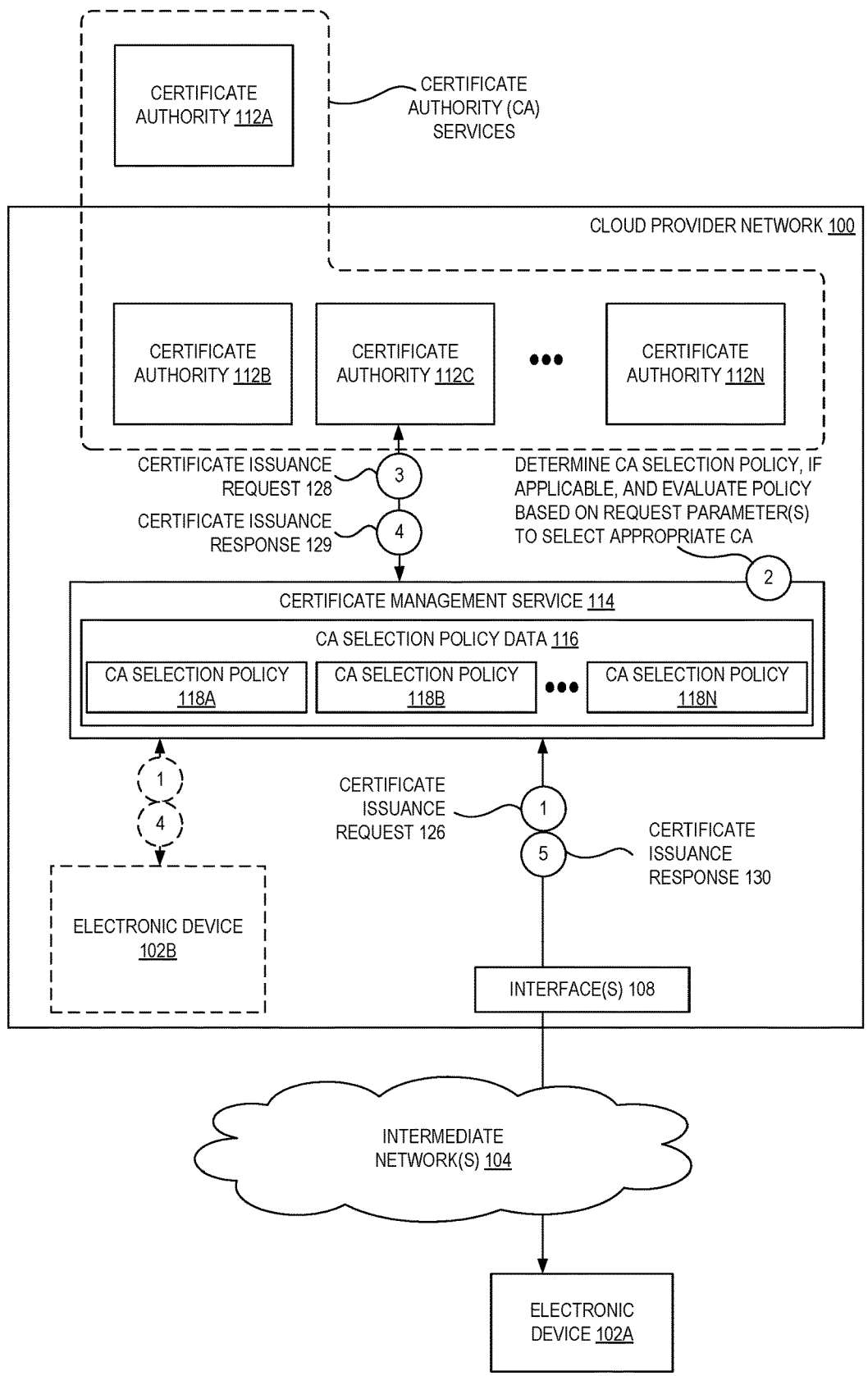
FIG. 1 is a diagram illustrating an environment for certificate authority selection according to some embodiments.

FIG. 1 is a diagram illustrating an environment for certificate authority selection according to some embodiments. A provider network 100 (or, "cloud" provider network) provides users with the ability to use one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources can be provided as services, such as a hardware virtualization service that can execute compute instances, a storage service that can store data objects, etc. The users (or "customers") of provider networks 100 can use one or more user accounts that are associated with a customer account, though these terms can be used somewhat interchangeably depending upon the context of use. Users can interact with a provider network 100 across one or more intermediate networks 104 (e.g., the internet) via one or more interface(s) 108, such as through use of application programming interface (API) calls, via a console implemented as a website or application, etc. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) 108 can be part of, or serve as a front-end to, a control plane of the provider network 100 that includes "backend" services supporting and enabling the services that can be more directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network can be formed as a number of regions, where a region is a geographical area in which the cloud provider clusters data centers. Each region includes multiple (e.g., two or more) availability zones (AZs) connected to one another via a private high-speed network, for example a fiber communication connection. An AZ (also known as a "zone") provides an isolated failure domain including one or more data center facilities with separate power, separate networking, and separate cooling from those in another AZ. A data center refers to a physical building or enclosure that houses and provides power and cooling to servers of the cloud provider network. Preferably, AZs within a region are positioned far enough away from one another so that a natural disaster (or other failure-inducing event) should not affect or take more than one AZ offline at the same time.

Users can connect to an AZ of the cloud provider network via a publicly accessible network (e.g., the Internet, a cellular communication network), e.g., by way of a transit center (TC). TCs are the primary backbone locations linking users to the cloud provider network and can be collocated at other network provider facilities (e.g., Internet service providers (ISPs), telecommunications providers) and securely connected (e.g., via a VPN or direct connection) to the AZs. Each region can operate two or more TCs for redundancy. Regions are connected to a global network which includes private networking infrastructure (e.g., fiber connections controlled by the cloud provider) connecting each region to at least one other region. The cloud provider network can deliver content from points of presence (or "POPs") outside of, but networked with, these regions by way of edge locations and regional edge cache servers. This compartmentalization and geographic distribution of computing hardware enables the cloud provider network to provide low-latency resource access to users on a global scale with a high degree of fault tolerance and stability.

Generally, the traffic and operations of a provider network can broadly be subdivided into two categories: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes user resources that are implemented on the provider network (e.g., computing instances, containers, block storage volumes, databases, file storage). Data plane traffic generally includes non-administrative operations, such as transferring user data to and from the user resources. The control plane components are typically implemented on a separate set of servers from the data plane servers, and control plane traffic and data plane traffic can be sent over separate/distinct networks.

To provide these and other computing resource services, provider networks 100 often rely upon virtualization techniques. For example, virtualization technologies can provide users the ability to control or use compute resources (e.g., a "compute instance," such as a VM using a guest operating system (O/S) that operates using a hypervisor that might or might not further operate on top of an underlying host O/S, a container that might or might not operate in a VM, a compute instance that can execute on "bare metal" hardware without an underlying hypervisor), where one or multiple compute resources can be implemented using a single electronic device. Thus, a user can directly use a compute resource (e.g., provided by a hardware virtualization service) hosted by the provider network to perform a variety of computing tasks. Additionally, or alternatively, a user can indirectly use a compute resource by submitting code to be executed by the provider network (e.g., via an on-demand code execution service), which in turn uses one or more compute resources to execute the code—typically without the user having any control of or knowledge of the underlying compute instance(s) involved.

As discussed above and now illustrated in FIG. 1, embodiments disclosed herein include a certificate management service (CMS) 114 of a provider network 100 that selects the appropriate CA for certificate requests. As illustrated, a plurality of CA services that can issue certificates are available. In particular, CAs 112A-112N include a CA 112A that is external to the provider network 100 and CAs 112B-112N that are internal to the provider network 100. CAs 112 may be public or private CAs. Public CAs issue certificates that are typically used across networks accessible to the public (e.g., the internal while private CAs issue certificates used in private networks (e.g., private company intranets). Additionally, CAs 112 may be services of the cloud provider, services of third-parties to the cloud provider and to users requesting a certificates, or services setup and configured by administrators of organizations that include users requesting certificates.

Users can use the CMS 114 to create and manage certificate-related resources. Various request types include certificate creation, certificate renewal, and certificate deletion. At least in the cases of certificate creation and renewal, because a particular request might invoke one of multiple CAs, the CMS can act as an interface to the CAs by receiving the request and selecting the appropriate CA to handle the request. To aid in handling CA selection, the CMS can be configured with one or more policies that govern the selection of a CA based upon one or more parameters indicated in the request. Upon receipt of a request from a requestor (e.g., a user), the CMS can identify one or more policies applicable to the request and then evaluate the policy or policies to determine which CA to use to satisfy the request.

A CA selection policy includes one or more CA selection rules to be applied to certificate-related requests. CA selection policies can be associated with users, roles, user groups, etc. An exemplary CA selection policy is illustrated and described with reference to FIG. 3. At a high level, the CMS 114 uses a CA selection policy to identify the appropriate CA based upon one or more parameters included in a certificate-related request. As illustrated, the CMS 114 has a plurality of CA selection policies 118A-118N in CA selection policy data 116. CA selection policy data 116 can be stored and accessed by the CMS 114 using a data store (not shown). An exemplary data store is a virtual data store provided by virtualized data storage service such as described elsewhere herein.

In addition to handling the selection of CAs, the CMS 114 can provide numerous other features related to creating, storing, and renewing public and private certificates (e.g., SSL/TLS X.509 certificates) and keys used to protect users' websites and applications. The certificates created via the CMS 114 can secure singular domain names, multiple specific domain names, wildcard domains, or combinations of these. Users can also export certificates signed by a private certificate authority managed by the CMS 114 for use anywhere in a user's internal PKI.

As indicated above, a SSL/TLS certificate allows web browsers and other applications to identify and establish encrypted network connections to web sites using the SSL/TLS protocol. Certificates are used within a cryptographic system knows as a public key infrastructure (PKI). PKI provides a way for one party to establish the identity of another party using certificates if they both trust a third-party, where the third-party is known as a certificate authority.

In some embodiments, the CMS 114 offers at least two different options for users desiring to deploy managed certificate-related resources. For example, the CMS 114 can provide public certificate management services for users who need a secure web presence using TLS. In some embodiments, certificate-related resources created by the CMS 114 can be deployed to user resources via other services provided by the cloud provider (e.g., via a load balancing service, a content delivery network (CDN) service, an API gateway service, or other service where users may have deployed endpoint resources) or otherwise returned to a requesting user. The CMS 114 can also provide features enabling the automatic renewal of expiring certificates.

In some embodiments, a CMS 114 also provides private certificate authority services. The private certificate authority services, for example, can be used for private use within an organization. In establishing a secure encrypted communications channel, each endpoint uses a certificate and cryptographic techniques to prove its identity to the other endpoint. Internal API endpoints, web servers, VPN users, IoT devices, and many other applications use private certificates to establish encrypted communication channels that are necessary for their secure operation. Users can create their own certificate authority (CA) hierarchy and issue certificates with it for authenticating users, computers, applications, services, and other devices.

In some embodiments, the certificate-related resources managed by a CMS 114 are associated with a number of characteristics. For example, in some embodiments, certificates issued by the CMS 114 are domain validated. The subject field of a certificate issued by the CMS 114 identifies a domain name thus, when a user requests a certificate, the user validates ownership or control of all the domains specified in a request. The ownership or control of the specified domain names can be validated by using email, DNS, or other methods supported by the CMS 114.

In some embodiments, certificates issued by a CA 112 may be associated with a defined validity period (e.g., 13 months, or any other period of time). The CMS 114 can also manage the process of renewing certificates and provisioning the certificates after they are renewed. In some embodiments, the certificates issued by a CA 112 are trusted by major browsers (Google Chrome, Microsoft Internet Explorer and Microsoft Edge, Mozilla Firefox, etc.) and operating systems.

In some embodiments, each CMS 114 certificate includes at least one fully qualified domain name (FQDN) and users can add additional names if desired. For example, a user creating a certificate for www.example.com can also add the name www.example.net if users reach the site using either name. The CMS 114 also allows users to use an asterisk (*) in the domain name to create a certificate containing a wildcard name that can protect several sites in the same domain. For example. *.example.com protects www.example.com and images.example.com. In some embodiments, a certificate also specifies an algorithm and key size. The CMS 114 may, for example support several public key algorithms including, but not limited to: 2048-bit RSA, 4096-bit RSA, Elliptic Prime Curve 256-bit, Elliptic Prime Curve 384-bit, etc. Certificates can be associated with other parameters as described herein.

As described above, one certificate-related request is the creation (or issuance) of a new certificate. An exemplary set of operations of the CMS 114 related to the creation of a certificate are now described with reference to the encircled numbers 1-5.

At circle "1," a user, using electronic device 102A, sends a request 126 to CMS 114 for a new certificate using an API provided by the CMS 114, a web-based console, a CLI, or other interface. The request typically includes an indication of the identity (or role) of the user and an identification of a domain name to associate with the requested certificate. The indication of the identity of the user may be a secure token or other credential that the user obtained when authenticating with the provider network 100. The domain name may be a fully qualified domain name, subdomain, wildcard domain, etc. (e.g., *.example.com, images.example.com, *.blog.example.com, etc.). In some embodiments, the domain name is some other indication of the identity of the entity that will use the certificate to secure communications.

At circle "2," the CMS 114 processes the request by identifying a policy applicable to the request using the indicated identity of the user in the request. For example, the CMS 114 can determine whether any CA selection policy 118 applies to the user account, a user role, or a user group associated with the user's identity indicated in the request. In some embodiments, the CMS 114 determines the role(s) and/or group(s) associated with the identity of a user by querying an organizations service (not shown) that facilitates the creation and grouping of user accounts. Based on the user's identity, role(s), and/or group(s), the CMS 114 identifies applicable CA selection policy or policies 118. The CMS 114 then evaluates the identified CA selection policy or policies 118 using the domain name included in the request to determine whether a CA is specified for the request. If no policy is applicable or if no rule in an applicable policy exists, the CMS 114 can direct requests to a default CA.

In some embodiments, the CMS 114 selects (or resolves) the appropriate CA 112 as follows. First, the CMS 114 checks whether a particular CA 112 was specified in the request 126. If no CA 112 was specified in the request 126, the CMS 114 can check whether one or more user, role, and/or group policies apply to the request (generally from most specific to least specific). For example, the CMS 114 can check whether a user-level policy exists and specifies a CA 112 for the domain name identified in the request. If no user-level policy exists or a user-level policy exists but is not applicable to the domain name, the CMS 114 checks whether a group-level policy exists for the user and specifies a CA 112 for the domain name identified in the request. If no group-level policy exists or a group-level policy exists but is not applicable to the domain name, the CMS 114 checks whether a default CA is specified for the user's organization. If no default CA is specified for the user's organization, the CMS 114 can defer to a default CA for all otherwise unresolved requests.

In some embodiments, CMS 114 has a footprint in multiple regions of the cloud provider network 100. Furthermore, certain regions may have different compliance requirements for CAs, so, for example, a CA that is usable in "Region X" might not be usable in "Region Y." Accordingly, CA selection policy data 116 may include region-specific policies (not shown). When identifying an applicable policy, the CMS 114 can check whether the request was received in a region having region-specific policies. If the request is received in a region with region-specific policies, the CMS 114 can resolve the applicable policy or policies from the region-specific policies.

At circle "3," the CMS 114 sends a certificate issuance request 128 based at least in part on the request 126 to the appropriate CA 112 (e.g., a default CA, a CA based upon the identification and evaluation of a CA selection policy, a CA specified in the request 126, etc.). In this example, the CMS 114 sends the request 128 to and receives the response 129 from the CA 112C. At circle "4," the CMS 114 receives a certificate issuance response 129 from the CA 112C. The response 129 may include the issued certificate or a reference to the issued certificate stored in a certificate data store (not shown).

At circle "5," the CMS 114 sends a certificate issuance response 130 based at least in part on the certificate issuance response 129 to the electronic device 102A. Again, the response 130 may include the issued certificate or a reference to the issued certificate stored in a certificate data store (not shown).

In some embodiments, the certificate issuance request and certificate issuance response may respectively originate from and return to an electronic device 102B within the provider network 100.

Figure 2:
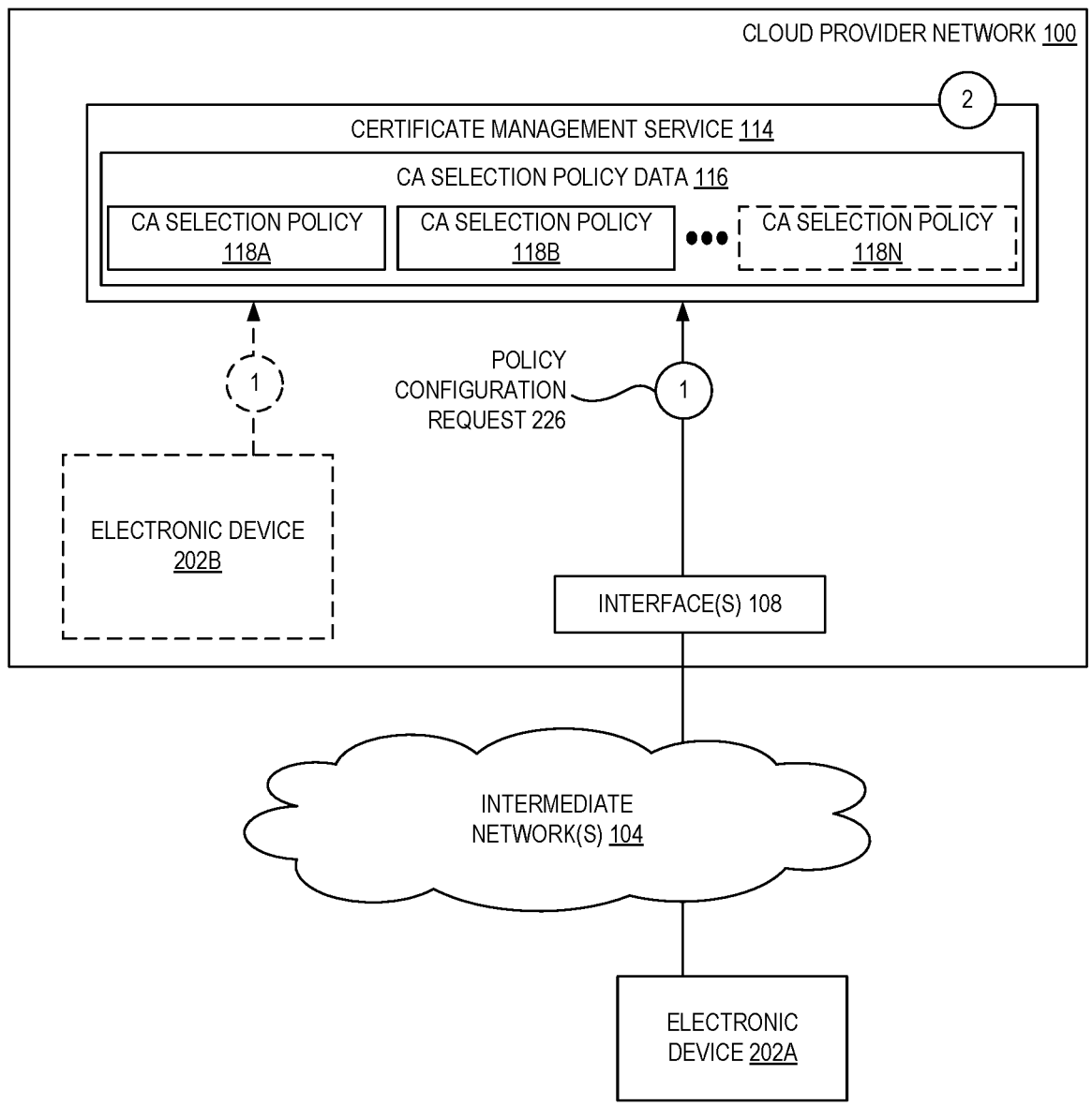
FIG. 2 is a diagram illustrating an environment for configuring certificate authority selection policies according to some embodiments.

FIG. 2 is a diagram illustrating an environment for configuring certificate authority selection policies according to some embodiments. An exemplary set of operations of the CMS 114 related to the configuration of CA selection policies are now described with reference to the encircled numbers 1-2.

At circle "1," a user such as a PKI administrator, using electronic device 202A, sends a request 226 to the CMS 114 to configure a CA selection policy 118. Such a user, for example, might be responsible for or otherwise desire to configure a set of CA selection rules within an organization to be applied to user(s), role(s), and/or group(s) of the organization. The ability for such a user to define CA selection policies applicable to group(s) or role(s) decreases the burden of coordinating certificate issuance within organizations.

In some embodiments, the definition of a CA selection policy 118 typically includes one or more rules and an identification of a user or group of users to which the policy is applicable. A rule associates a domain name or other identifier with which a certificate is to be associated with a CA (e.g., one of CAs 112 in FIG. 1). The identification of the applicability of the policy to specific user(s) or group(s) of users allows the CMS 114 to determine whether to evaluate the policy as part of a certificate-related request. An exemplary CA selection policy is illustrated and described with reference to FIG. 3.

In some embodiments, the selected users or roles to which a policy or rule is to be applied can be selected based on selection of user accounts, roles, user groups, organizations, or other groupings of users or roles, where such user accounts, roles, user groups, and organizations can be defined using an identity and access management service provided by the cloud provider network 100 or using an identity and access management system controlled by the organization configuring the policy.

Exemplary configuration requests 226 include requests to create new CA selection policies, requests to update existing CA selection policies, and requests to delete CA selection policies. A request to create a new CA selection policy typically includes one or more rules and an identification of a user or group of users to which the policy is applicable. A request to update an existing CA selection policy typically includes an identification of the policy to be updated (often identified with a policy identifier returned upon creation of a policy or identified when a user lists existing policies) and any updates to make to the policy. For example, updates may take the form of individual additions or removals to the applicability or rules specified in the policy or new applicability or rules to replace the existing applicability or rules of a policy. A request to delete an existing CA selection policy typically includes an identification of the policy to be deleted.

In some embodiments, the configuration request 226 is submitted via an API provided by the CMS 114, a web-based console, a CLI, or other interface. For example, a user desiring to configure a certificate issuance policy can login to a web-based console provided by the CMS 114 and provide input indicating that the user desires to configure a CA selection policy. The web-based console can then provide a guided set of interfaces and interface elements requesting input used to configure the policy.

At circle "2," the CMS 114 processes the request 226. For example, the CMS 114 creates a new CA selection policy in response to a policy creation request, deletes an existing CA selection policy in response to a policy deletion request, or updates an existing policy in response to a policy update request. The CMS 114 can store the newly created certificate, update an existing certificate, or delete a certificate from a certificate data store (not shown). In some embodiments, the CMS 114 returns an identification of the created, updated, or deleted policy to the originator of the configuration request 226.

In some embodiments, the policy configuration request may originate from an electronic device 102B within the provider network 100.

Figure 3:
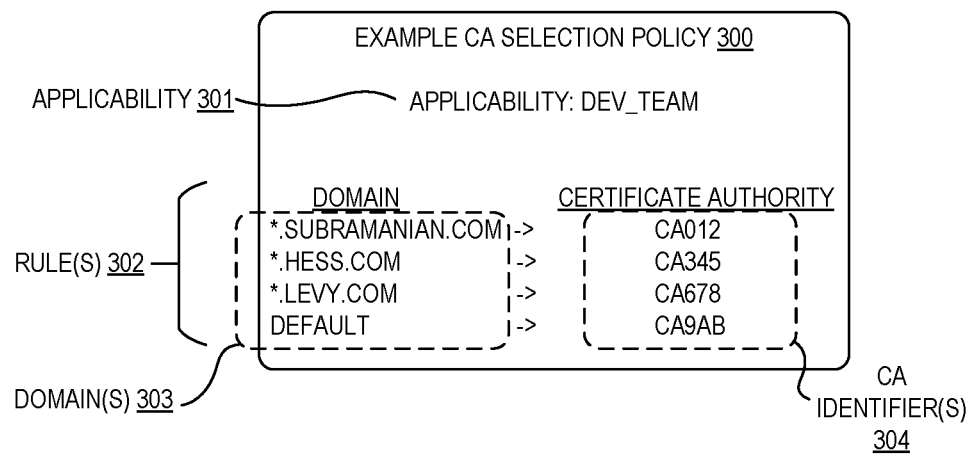
FIG. 3 is a diagram illustrating an exemplary certificate authority selection policy according to some embodiments.

FIG. 3 is a diagram illustrating an exemplary certificate authority selection policy 300 according to some embodiments. As illustrated, a CA selection policy typically includes one or more rules and an identification of a user or group of users to which the policy is applicable. Exemplary CA selection policy 300 includes applicability 301 and rule(s) 302. In this example, the applicability 301 is to a group, "DEV_TEAM," so users associated with that group may have the CA selection policy 300 applied by the CMS 114 (e.g., if no more specific policy was applicable). As discussed, in some embodiments, the applicability of policies may be stored separately from policy data (e.g., rules) as metadata that is associated with respective policies.

Rule(s) 302 associate a domain name or other identifier 303 with an identifier of a CA 304 (such as CAs 112). The example CA selection policy 300 includes four rules. One rule associates subdomains of the domain subramanian.com with a CA having an identifier "CA012." Another rule associates subdomains of the domain hess.com with a CA having an identifier "CA345." Another rule associates subdomains of the domain levy.com with a CA having an identifier "CA678." Another rule associates all unspecified (e.g., default) domains with a CA having an identifier "CA9AB." CA identifiers 304—e.g., "CA012," "CA345," "CA678," and "CA9AB"— can directly or indirectly identify various CAs (e.g., via a network address, an alias, a domain name, etc.).

CA selection policies such as CA selection policies 118 and 300 can, for example, be stored as text documents or other data structures containing a structured representation (e.g., JSON-formatted) of the rules contained in the policy and, possible, the applicability of the policy. For example, each policy and/or rule can be specified and stored in a structured representation identifying one or more users or groups to which the policy or rule applies and one or more rules. As described herein, the applicability of a particular CA selection policy may be stored with the policy or as metadata separate from the policy itself. Such metadata about the policies in the CA selection policy data can include, for each policy, an identifier of the policy and the applicability of that policy. The CMS 114 can evaluate the policy applicability metadata to determine whether any policies are applicable to a given certificate-related request.

Figure 4:
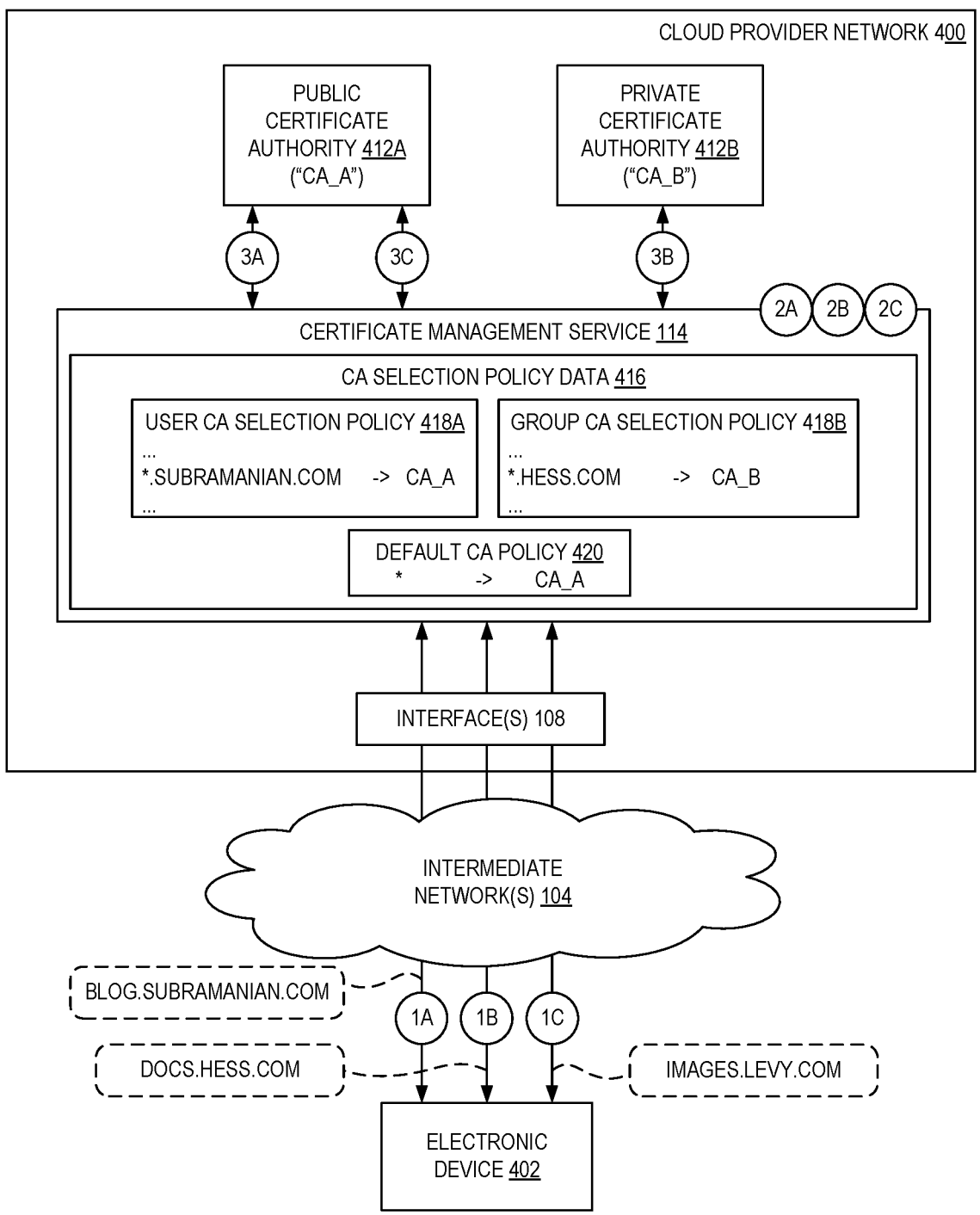
FIG. 4 is a diagram illustrating an environment in which different certificate authorities are selected according to some embodiments.

FIG. 4 is a diagram illustrating an environment in which different certificate authorities are selected according to some embodiments. As illustrated, the cloud provider network 100 includes two CAs—a public CA 412A denoted as "CA_A" and a private CA 412B denoted as "CA_B." CA selection policy data 416 includes a CA selection policy 418A associated with a user, a CA selection policy 418B associated with a group that includes the user, and a default CA policy 420. The CA selection policy 418A includes a rule indicating that certificate requests associated with subdomains of subramanian.com are to be handled by CA_A (CA 412A). The CA selection policy 418B includes a rule indicating that certificate requests associated with subdomains of hess.com are to be handled by CA_B (CA 412B). And the default CA 420 identifies CA_A (CA 412A).

In this example, three certificate-creation requests are submitted to the CMS 114 by a user of an electronic device 402 across one or more intermediate networks 104 (e.g., the internet) via one or more interface(s) 108 to the cloud provider network 100. Operations associated with the first request are described with reference to the encircled 1A-3A; operations associated with the second request are described with reference to the encircled 1B-3B; and operations associated with the third request are described with reference to the encircled 1C-3C.

In a first certificate creation request, at circle "1A," a user, using electronic device 402, sends a request to CMS 114 for a new certificate. The request includes an indication of the identity of the user. In this example, we assume the user's identity is "User A." The request also includes a domain name for which to create the certificate—blog.subramanian.com. At circle "2A," the CMS 114 identifies that the CA selection policy 418A is associated with User A (e.g., based on included applicability data or other metadata). The CMS 114 then evaluates the policy using contents of the request. Here, the CA selection policy 418A includes a rule indicating that certificates for subdomains of subramanian.com are to be issued by CA_A (CA 412A). At circle "3A," the CMS 114 sends a request to the identified CA, CA_A. An issuance response (whether a certificate or a reference to a certificate) is then sent from CA 412A back to the electronic device 402 via the CMS 114.

In a second certificate creation request, at circle "1B," the user, using electronic device 402, sends a request to CMS 114 for a new certificate. Again, the request includes an indication of the identity of the user (User A). The request also includes a domain name for which to create the certificate—docs.hess.com. At circle "2B," the CMS 114 first identifies and checks CA selection policy 418A associated with User A and determines that the CA policy 418A does not have an applicable rule for the hess.com domain. The CMS 114 also identifies a group (or role) CA selection policy 418B applicable to a group or role that includes the identified user. Here, the group CA selection policy 418B includes a rule indicating that certificates for subdomains of hess.com are to be issued by CA_B (CA 412B). At circle "3B," the CMS 114 sends a request to the identified CA, CA_B. An issuance response (whether a certificate or a reference to a certificate) is then sent from CA 412B back to the electronic device 402 via the CMS 114.

In a third certificate creation request, at circle "1C," the user, using electronic device 402, sends a request to CMS 114 for a new certificate. Again, the request includes an indication of the identity of the user (User A). The request also includes a domain name for which to create the certificate—images.levy.com. At circle "2C," the CMS 114 first identifies and checks CA selection policy 418A associated with User A and determines that the CA policy 418A does not have an applicable rule for the levy.com domain. The CMS 114 also identifies a group (or role) CA selection policy 418B applicable to a group or role that includes the identified user and determines that the CA policy 418B also does not have an applicable rule for the levy.com domain. The CMS 114 has a default CA policy 420 that indicates requests not handled by other policies are to be issued by CA_A (CA 412A). At circle "3C," the CMS 114 sends a request to the identified default CA, CA_A. An issuance response (whether a certificate or a reference to a certificate) is then sent from CA 412A back to the electronic device 402 via the CMS 114.

Figure 5:
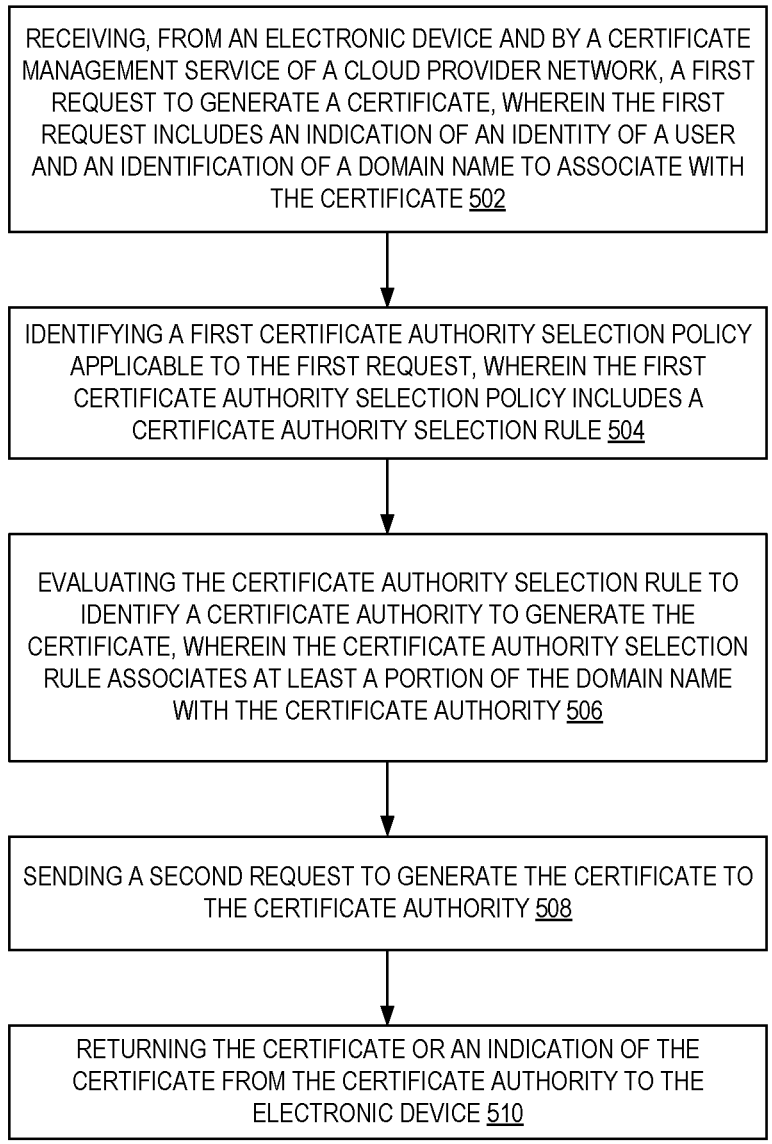
FIG. 5 is a flow diagram illustrating operations of a method for certificate authority selection according to some embodiments.

FIG. 5 is a flow diagram illustrating operations 500 of a method for certificate authority selection according to some embodiments. Some or all of the operations 500 (or other processes described herein, or variations, and/or combinations thereof) are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some embodiments, one or more (or all) of the operations 500 are performed by the CMS 114 of the other figures.

The operations 500 include, at block 502, receiving, from an electronic device and by a certificate management service of a cloud provider network, a first request to generate a certificate, wherein the first request includes an indication of an identity of a user and an identification of a domain name to associate with the certificate.

The operations 500 further include, at block 504, identifying a first certificate authority selection policy applicable to the first request, wherein the first certificate authority selection policy includes a certificate authority selection rule.

The operations 500 further include, at block 506, evaluating the certificate authority selection rule to identify a certificate authority to generate the certificate, wherein the certificate authority selection rule associates at least a portion of the domain name with the certificate authority.

The operations 500 further include, at block 508, sending a second request to generate the certificate to the certificate authority.

The operations 500 further include, at block 510, returning the certificate or an identification of the certificate from the certificate authority to the electronic device.

In some embodiments, the first request does not include an identification of any certificate authority.

In some embodiments, prior to evaluating the certificate authority selection rule, a second certificate authority selection policy applicable to the first request is identified and the second certificate authority selection policy is determined to not include a rule associated with the domain name In such a case, for example, the first certificate authority selection policy can be associated with a group that includes the identity of the user and the second certificate authority selection policy can be associated with the identity of the user.

In some embodiments, the CMS receives a third request to create the first certificate authority selection policy, wherein the third request includes (a) an association of at least a portion of the domain name with the certificate authority and (b) a policy applicability to associate the first certificate authority selection policy with at least one of (i) the identity of a user, (ii) a role associated with the identity of the user, or (iii) a group that includes the identity of the user, and the CMS stores the first certificate authority selection policy in a data store. The policy applicability can be stored in metadata associated with the first certificate authority selection policy or as part of the first certificate authority selection policy.

In some embodiments, the certificate authority is (a) a private certificate authority service configured for use by an administrator of an organization that includes the user or (b) a public certificate authority, wherein the public certificate authority is a service of the cloud provider network or of a third-party.

In some embodiments, the first certificate authority selection policy is applicable to the first request by at least one of: (a) the first certificate authority selection policy is associated with the identity of the user, (b) the first certificate authority selection policy is associated with a role associated with the identity of the user, (c) the first certificate authority selection policy is associated with a group that includes the identity of the user, or (d) the first certificate authority selection policy is a default policy.

In some embodiments, the first certificate authority selection policy is associated with a geographic region, and wherein the first certificate authority selection policy is applicable to the first request based at least in part on the first request being received by the certificate management service in the geographic region.

In some embodiments, the certificate authority is one of a plurality of certificate authorities available to the user.

Figure 6:
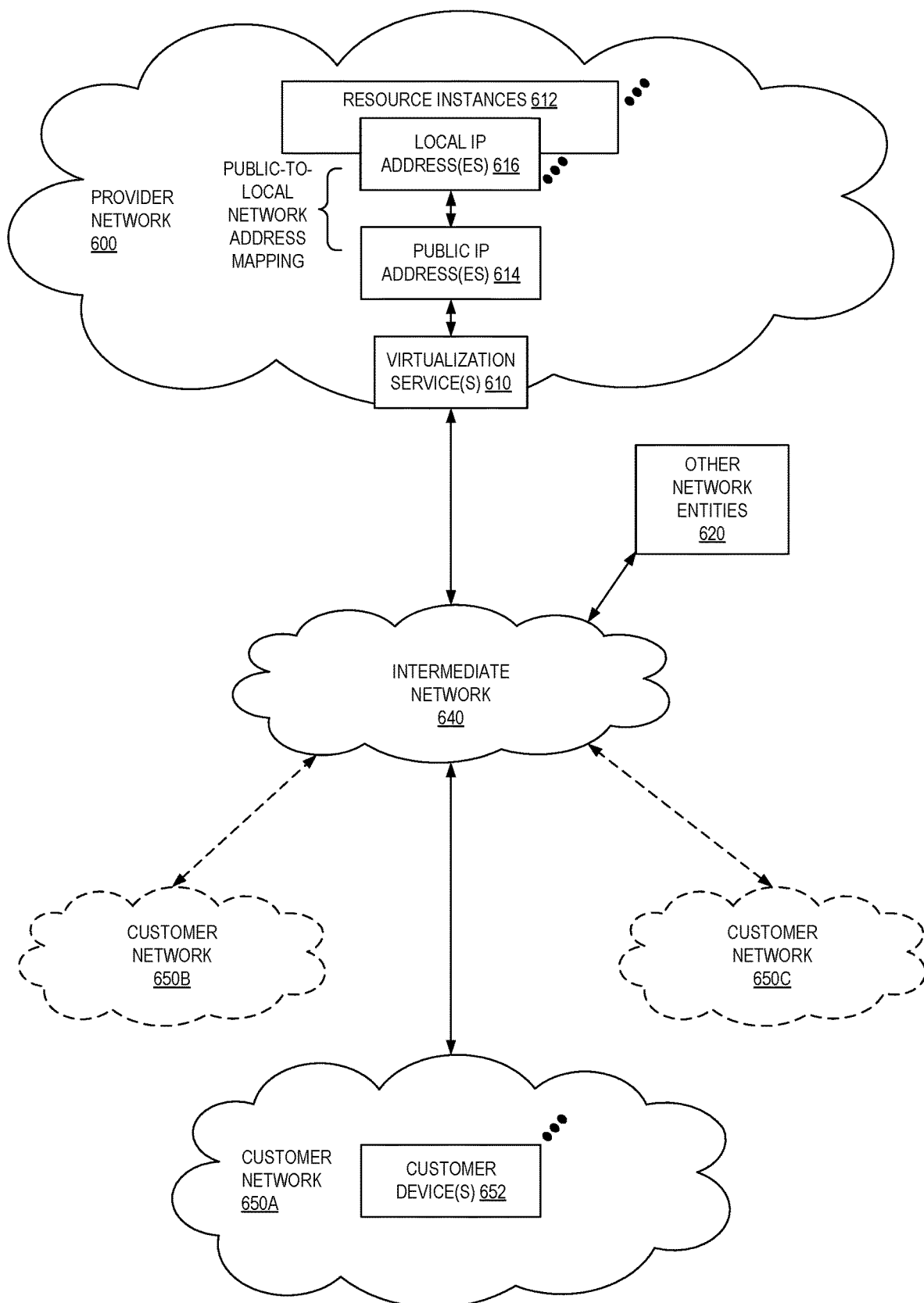
FIG. 6 illustrates an example provider network environment according to some embodiments.

FIG. 6 illustrates an example provider network (or "service provider system") environment according to some embodiments. A provider network 600 can provide resource virtualization to customers via one or more virtualization services 610 that allow customers to purchase, rent, or otherwise obtain instances 612 of virtualized resources, including but not limited to computation and storage resources, implemented on devices within the provider network or networks in one or more data centers. Local Internet Protocol (IP) addresses 616 can be associated with the resource instances 612; the local IP addresses are the internal network addresses of the resource instances 612 on the provider network 600. In some embodiments, the provider network 600 can also provide public IP addresses 614 and/or public IP address ranges (e.g., Internet Protocol version 4 (IPv4) or Internet Protocol version 6 (IPv6) addresses) that customers can obtain from the provider 600.

Conventionally, the provider network 600, via the virtualization services 610, can allow a customer of the service provider (e.g., a customer that operates one or more customer networks 650A-650C (or "client networks") including one or more customer device(s) 652) to dynamically associate at least some public IP addresses 614 assigned or allocated to the customer with particular resource instances 612 assigned to the customer. The provider network 600 can also allow the customer to remap a public IP address 614, previously mapped to one virtualized computing resource instance 612 allocated to the customer, to another virtualized computing resource instance 612 that is also allocated to the customer. Using the virtualized computing resource instances 612 and public IP addresses 614 provided by the service provider, a customer of the service provider such as the operator of the customer network(s) 650A-650C can, for example, implement customer-specific applications and present the customer's applications on an intermediate network 640, such as the Internet. Other network entities 620 on the intermediate network 640 can then generate traffic to a destination public IP address 614 published by the customer network(s) 650A-650C; the traffic is routed to the service provider data center, and at the data center is routed, via a network substrate, to the local IP address 616 of the virtualized computing resource instance 612 currently mapped to the destination public IP address 614. Similarly, response traffic from the virtualized computing resource instance 612 can be routed via the network substrate back onto the intermediate network 640 to the source entity 620.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and can be mutable within the provider network. Network traffic originating outside the provider network is not directly routed to local IP addresses; instead, the traffic uses public IP addresses that are mapped to the local IP addresses of the resource instances. The provider network can include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses can be assigned by the provider network infrastructure to particular resource instances; these public IP addresses can be referred to as standard public IP addresses, or simply standard IP addresses. In some embodiments, the mapping of a standard IP address to a local IP address of a resource instance is the default launch configuration for all resource instance types.

At least some public IP addresses can be allocated to or obtained by customers of the provider network 600; a customer can then assign their allocated public IP addresses to particular resource instances allocated to the customer. These public IP addresses can be referred to as customer public IP addresses, or simply customer IP addresses. Instead of being assigned by the provider network 600 to resource instances as in the case of standard IP addresses, customer IP addresses can be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 7:
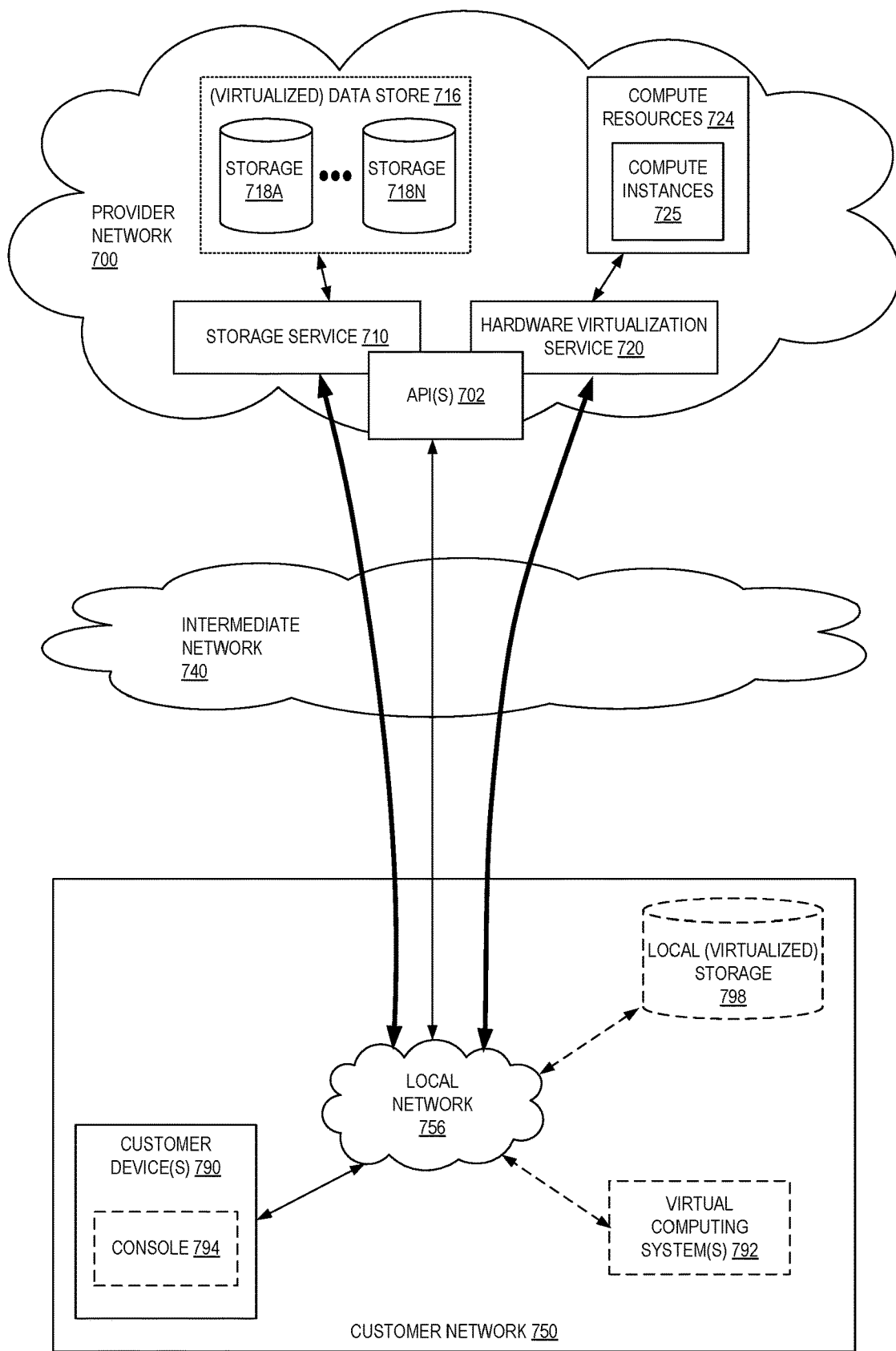
FIG. 7 is a block diagram of an example provider network that provides a storage service and a hardware virtualization service to customers according to some embodiments.

FIG. 7 is a block diagram of an example provider network environment that provides a storage service and a hardware virtualization service to customers, according to some embodiments. A hardware virtualization service 720 provides multiple compute resources 724 (e.g., compute instances 725, such as VMs) to customers. The compute resources 724 can, for example, be provided as a service to customers of a provider network 700 (e.g., to a customer that implements a customer network 750). Each computation resource 724 can be provided with one or more local IP addresses. The provider network 700 can be configured to route packets from the local IP addresses of the compute resources 724 to public Internet destinations, and from public Internet sources to the local IP addresses of the compute resources 724.

The provider network 700 can provide the customer network 750, for example coupled to an intermediate network 740 via a local network 756, the ability to implement virtual computing systems 792 via the hardware virtualization service 720 coupled to the intermediate network 740 and to the provider network 700. In some embodiments, the hardware virtualization service 720 can provide one or more APIs 702, for example a web services interface, via which the customer network 750 can access functionality provided by the hardware virtualization service 720, for example via a console 794 (e.g., a web-based application, standalone application, mobile application, etc.) of a customer device 790. In some embodiments, at the provider network 700, each virtual computing system 792 at the customer network 750 can correspond to a computation resource 724 that is leased, rented, or otherwise provided to the customer network 750.

From an instance of the virtual computing system(s) 792 and/or another customer device 790 (e.g., via console 794), the customer can access the functionality of a storage service 710, for example via the one or more APIs 702, to access data from and store data to storage resources 718A-718N of a virtual data store 716 (e.g., a folder or "bucket," a virtualized volume, a database, etc.) provided by the provider network 700. In some embodiments, a virtualized data store gateway (not shown) can be provided at the customer network 750 that can locally cache at least some data, for example frequently accessed or critical data, and that can communicate with the storage service 710 via one or more communications channels to upload new or modified data from a local cache so that the primary store of data (the virtualized data store 716) is maintained. In some embodiments, a user, via the virtual computing system 792 and/or another customer device 790, can mount and access virtual data store 716 volumes via the storage service 710 acting as a storage virtualization service, and these volumes can appear to the user as local (virtualized) storage 798.

While not shown in FIG. 7, the virtualization service(s) can also be accessed from resource instances within the provider network 700 via the API(s) 702. For example, a customer, appliance service provider, or other entity can access a virtualization service from within a respective virtual network on the provider network 700 via the API(s) 702 to request allocation of one or more resource instances within the virtual network or within another virtual network.

Illustrative Systems

Figure 8:
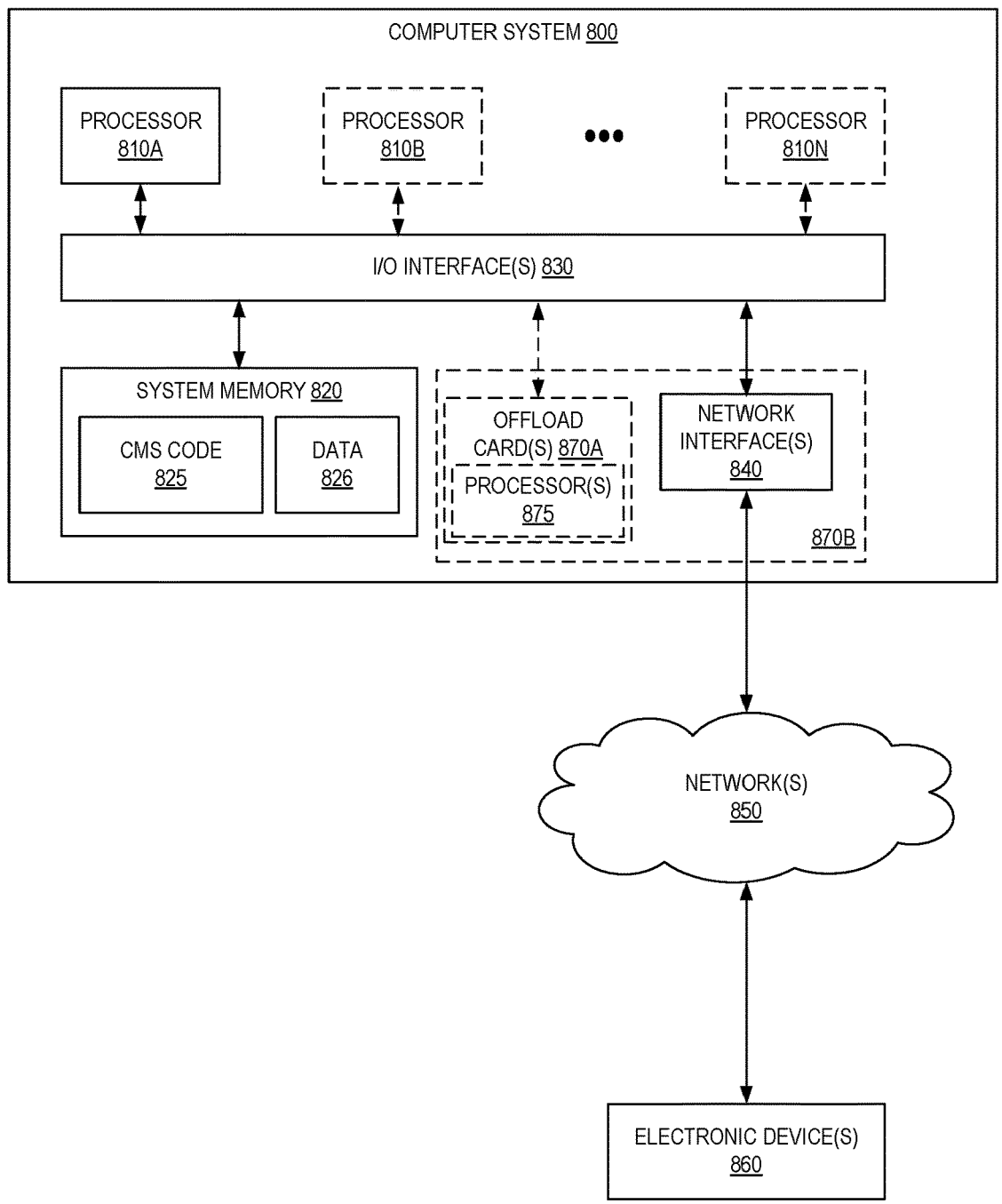
FIG. 8 is a block diagram illustrating an example computer system that can be used in some embodiments.

In some embodiments, a system that implements a portion or all of the techniques described herein can include a general-purpose computer system, such as the computer system 800 illustrated in FIG. 8, that includes, or is configured to access, one or more computer-accessible media. In the illustrated embodiment, the computer system 800 includes one or more processors 810 coupled to a system memory 820 via an input/output (I/O) interface 830. The computer system 800 further includes a network interface 840 coupled to the I/O interface 830. While FIG. 8 shows the computer system 800 as a single computing device, in various embodiments the computer system 800 can include one computing device or any number of computing devices configured to work together as a single computer system 800.

In various embodiments, the computer system 800 can be a uniprocessor system including one processor 810, or a multiprocessor system including several processors 810 (e.g., two, four, eight, or another suitable number). The processor(s) 810 can be any suitable processor(s) capable of executing instructions. For example, in various embodiments, the processor(s) 810 can be general-purpose or embedded processors implementing any of a variety of instruction set architectures (ISAs), such as the x86, ARM, PowerPC, SPARC, or MIPS ISAs, or any other suitable ISA. In multiprocessor systems, each of the processors 810 can commonly, but not necessarily, implement the same ISA.

The system memory 820 can store instructions and data accessible by the processor(s) 810. In various embodiments, the system memory 820 can be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within the system memory 820 as CMS code 825 (e.g., executable to implement, in whole or in part, the CMS 114) and data 826 such as CA selection policy data 116, 416.

In some embodiments, the I/O interface 830 can be configured to coordinate I/O traffic between the processor 810, the system memory 820, and any peripheral devices in the device, including the network interface 840 and/or other peripheral interfaces (not shown). In some embodiments, the I/O interface 830 can perform any necessary protocol, timing, or other data transformations to convert data signals from one component (e.g., the system memory 820) into a format suitable for use by another component (e.g., the processor 810). In some embodiments, the I/O interface 830 can include support for devices attached through various types of peripheral buses, such as a variant of the Peripheral Component Interconnect (PCI) bus standard or the Universal Serial Bus (USB) standard, for example. In some embodiments, the function of the I/O interface 830 can be split into two or more separate components, such as a north bridge and a south bridge, for example. Also, in some embodiments, some or all of the functionality of the I/O interface 830, such as an interface to the system memory 820, can be incorporated directly into the processor 810.

The network interface 840 can be configured to allow data to be exchanged between the computer system 800 and other devices 860 attached to a network or networks 850, such as other computer systems or devices as illustrated in FIG. 1, for example. In various embodiments, the network interface 840 can support communication via any suitable wired or wireless general data networks, such as types of Ethernet network, for example. Additionally, the network interface 840 can support communication via telecommunications/ telephony networks, such as analog voice networks or digital fiber communications networks, via storage area networks (SANs), such as Fibre Channel SANs, and/or via any other suitable type of network and/or protocol.

In some embodiments, the computer system 800 includes one or more offload cards 870A or 870B (including one or more processors 875, and possibly including the one or more network interfaces 840) that are connected using the I/O interface 830 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 800 can act as a host electronic device (e.g., operating as part of a hardware virtualization service) that hosts compute resources such as compute instances, and the one or more offload cards 870A or 870B execute a virtualization manager that can manage compute instances that execute on the host electronic device. As an example, in some embodiments the offload card(s) 870A or 870B can perform compute instance management operations, such as pausing and/or un-pausing compute instances, launching and/or terminating compute instances, performing memory transfer/copying operations, etc. These management operations can, in some embodiments, be performed by the offload card(s) 870A or 870B in coordination with a hypervisor (e.g., upon a request from a hypervisor) that is executed by the other processors 810A-810N of the computer system 800. However, in some embodiments the virtualization manager implemented by the offload card(s) 870A or 870B can accommodate requests from other entities (e.g., from compute instances themselves), and can not coordinate with (or service) any separate hypervisor.

In some embodiments, the system memory 820 can be one embodiment of a computer-accessible medium configured to store program instructions and data as described above. However, in other embodiments, program instructions and/ or data can be received, sent, or stored upon different types of computer-accessible media. Generally speaking, a computer-accessible medium can include any non-transitory storage media or memory media such as magnetic or optical media, e.g., disk or DVD/CD coupled to the computer system 800 via the I/O interface 830. A non-transitory computer-accessible storage medium can also include any volatile or non-volatile media such as RAM (e.g., SDRAM, double data rate (DDR) SDRAM, SRAM, etc.), read only memory (ROM), etc., that can be included in some embodiments of the computer system 800 as the system memory 820 or another type of memory. Further, a computer-accessible medium can include transmission media or signals such as electrical, electromagnetic, or digital signals, conveyed via a communication medium such as a network and/or a wireless link, such as can be implemented via the network interface 840.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments use at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments using a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also can be capable of executing programs or scripts in response requests from user devices, such as by executing one or more Web applications that can be implemented as one or more scripts or programs written in any programming language, such as Java®, C, C# or C++, or any scripting language, such as Perl, Python, PHP, or TCL, as well as combinations thereof. The server(s) can also include database servers, including without limitation those commercially available from Oracle®, Microsoft®, Sybase®, IBM®, etc. The database servers can be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information can reside in a storage-area network (SAN) familiar to those skilled in the art. Similarly, any necessary files for performing the functions attributed to the computers, servers, or other network devices can be stored locally and/or remotely, as appropriate. Where a system includes computerized devices, each such device can include hardware elements that can be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system can also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments can have numerous variations from that described above. For example, customized hardware might also be used and/or particular elements might be implemented in hardware, software (including portable software, such as applets), or both. Further, connection to other computing devices such as network input/output devices can be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments can be practiced without the specific details. Furthermore, well-known features can be omitted or simplified in order not to obscure the embodiment being described.

Bracketed text and blocks with dashed borders (e.g., large dashes, small dashes, dot-dash, and dots) are used herein to illustrate optional aspects that add additional features to some embodiments. However, such notation should not be taken to mean that these are the only options or optional operations, and/or that blocks with solid borders are not optional in certain embodiments.

Reference numerals with suffix letters (e.g., 718A-718N) can be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters might or might not have the same number of instances in various embodiments.

References to "one embodiment," "an embodiment," "an example embodiment," etc., indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). Similarly, language such as "at least one or more of A, B, and C" (or "one or more of A, B, and C") is intended to be understood to mean A, B, or C, or any combination thereof (e.g., A, B, and/or C). As such, disjunctive language is not intended to, nor should it be understood to, imply that a given embodiment requires at least one of A, at least one of B, and at least one of C to each be present.

As used herein, the term "based on" (or similar) is an open-ended term used to describe one or more factors that affect a determination or other action. It is to be understood that this term does not foreclose additional factors that may affect a determination or action. For example, a determination may be solely based on the factor(s) listed or based on the factor(s) and one or more additional factors. Thus, if an action A is "based on" B, it is to be understood that B is one factor that affects action A, but this does not foreclose the action from also being based on one or multiple other factors, such as factor C. However, in some instances, action A may be based entirely on B.

Unless otherwise explicitly stated, articles such as "a" or "an" should generally be interpreted to include one or multiple described items. Accordingly, phrases such as "a device configured to" or "a computing device" are intended to include one or multiple recited devices. Such one or more recited devices can be collectively configured to carry out the stated operations. For example, "a processor configured to carry out operations A, B, and C" can include a first processor configured to carry out operation A working in conjunction with a second processor configured to carry out operations B and C.

Further, the words "may" or "can" are used in a permissive sense (i.e., meaning having the potential to), rather than the mandatory sense (i.e., meaning must). The words "include," "including," and "includes" are used to indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for the nouns that they precede, and do not imply any type of ordering (e.g., spatial, temporal, logical, etc.) unless such an ordering is otherwise explicitly indicated.

The specification and drawings are, accordingly, to be regarded in an illustrative rather than a restrictive sense. It will, however, be evident that various modifications and changes can be made thereunto without departing from the broader spirit and scope of the disclosure as set forth in the claims.

What is claimed is:

1. A computer-implemented method comprising:

receiving, by a certificate management service of a cloud provider network, a first request to create a first certificate authority selection policy, wherein the first request includes (a) an association of a first domain name with a certificate authority and (b) a policy applicability to associate the first certificate authority selection policy with at least one of (i) an identity of a user, (ii) a role associated with the identity of the user, or (iii) a group that includes the identity of the user;

storing the first certificate authority selection policy and the policy applicability in a data store, wherein the first certificate authority selection policy includes a certificate authority selection rule that associates the first domain name with the certificate authority;

receiving, from an electronic device and by the certificate management service, a second request to generate a certificate, wherein the second request includes an indication of the identity of the user and an identification of a second domain name to associate with the certificate;

identifying the first certificate authority selection policy applicable to the second request based at least in part on the policy applicability;

evaluating the certificate authority selection rule to identify the certificate authority based at least in part on the second domain name being a subdomain of the first domain name;

sending a third request to generate the certificate to the certificate authority; and returning the certificate or an identification of the certificate from the certificate authority to the electronic device.

2. The computer-implemented method of claim 1, wherein the second request does not include an identification of any certificate authority.

3. The computer-implemented method of claim 1, further comprising:

prior to evaluating the certificate authority selection rule:
identifying a second certificate authority selection policy applicable to the first request; and
determining the second certificate authority selection policy does not include a rule associated with the second domain name.

4. A computer-implemented method comprising:

receiving, from an electronic device and by a certificate management service of a cloud provider network, a first request to generate a certificate, wherein the first request includes an indication of an identity of a user and an identification of a domain name to associate with the certificate;

identifying a first certificate authority selection policy applicable to the first request, wherein the first certificate authority selection policy includes a certificate authority selection rule;

evaluating the certificate authority selection rule to identify a certificate authority to generate the certificate, wherein the certificate authority selection rule associates at least a portion of the domain name with the certificate authority;

sending a second request to generate the certificate to the certificate authority; and returning the certificate or an identification of the certificate from the certificate authority to the electronic device.

5. The computer-implemented method of claim 4, wherein the first request does not include an identification of any certificate authority.

6. The computer-implemented method of claim 4, further comprising:

prior to evaluating the certificate authority selection rule:
identifying a second certificate authority selection policy applicable to the first request; and
determining the second certificate authority selection policy does not include a rule associated with the domain name.

7. The computer-implemented method of claim 6, wherein the first certificate authority selection policy is associated with a group that includes the identity of the user and the second certificate authority selection policy is associated with the identity of the user.

8. The computer-implemented method of claim 4, further comprising:

receiving, by the certificate management service, a third request to create the first certificate authority selection policy, wherein the third request includes (a) an association of at least a portion of the domain name with the certificate authority and (b) a policy applicability to associate the first certificate authority selection policy with at least one of (i) the identity of a user, (ii) a role associated with the identity of the user, or (iii) a group that includes the identity of the user; and storing the first certificate authority selection policy in a data store.

9. The computer-implemented method of claim 8, wherein the policy applicability is stored in metadata associated with the first certificate authority selection policy.

10. The computer-implemented method of claim 4, wherein the certificate authority is (a) a private certificate authority service configured for use by an administrator of an organization that includes the user or (b) a public certificate authority, wherein the public certificate authority is a service of the cloud provider network or of a third-party.

11. The computer-implemented method of claim 4, wherein the first certificate authority selection policy is applicable to the first request by at least one of: (a) the first certificate authority selection policy is associated with the identity of the user, (b) the first certificate authority selection policy is associated with a role associated with the identity of the user, (c) the first certificate authority selection policy is associated with a group that includes the identity of the user, or (d) the first certificate authority selection policy is a default policy.

12. The computer-implemented method of claim 11, wherein the first certificate authority selection policy is associated with a geographic region, and wherein the first certificate authority selection policy is further applicable to the first request based at least in part on the first request being received by the certificate management service in the geographic region.

13. The computer-implemented method of claim 4, wherein the certificate authority is one of a plurality of certificate authorities available to the user.

14. A system comprising:

a first one or more electronic devices to implement a data storage service of a cloud provider network, the data storage service including instructions that upon execution cause the data storage service to store certificate authority selection policy data; and a second one or more electronic devices to implement a certificate management service of the cloud provider network, the certificate management service including instructions that upon execution cause the certificate management service to:

receive, from a third electronic device, a first request to generate a certificate, wherein the first request includes an indication of an identity of a user and an identification of a domain name to associate with the certificate;

identify a first certificate authority selection policy applicable to the first request and in the certificate authority selection policy data, wherein the first certificate authority selection policy includes a certificate authority selection rule;

evaluate the certificate authority selection rule to identify a certificate authority to generate the certificate, wherein the certificate authority selection rule associates at least a portion of the domain name with the certificate authority;

send a second request to generate the certificate to the certificate authority; and return the certificate or an identification of the certificate from the certificate authority to the third electronic device.

15. The system of claim 14, wherein the first request does not include an identification of any certificate authority.

16. The system of claim 14, the certificate management service including further instructions that upon execution cause the certificate management service to:

prior to evaluating the certificate authority selection rule:
identify a second certificate authority selection policy applicable to the first request; and
determine the second certificate authority selection policy does not include a rule associated with the domain name.

17. The system of claim 16, wherein the first certificate authority selection policy is associated with a group that includes the identity of the user and the second certificate authority selection policy is associated with the identity of the user.

18. The system of claim 14, the certificate management service including further instructions that upon execution cause the certificate management service to:

receive a third request to create the first certificate authority selection policy, wherein the third request includes (a) an association of at least a portion of the domain name with the certificate authority and (b) a policy applicability to associate the first certificate authority selection policy with at least one of (i) the identity of a user, (ii) a role associated with the identity of the user, or (iii) a group that includes the identity of the user; and store the first certificate authority selection policy in the certificate authority selection policy data.

19. The system of claim 18, wherein the policy applicability is stored as metadata in the certificate authority selection policy data and associated with the first certificate authority selection policy.

20. The system of claim 14, wherein the certificate authority is (a) a private certificate authority service configured for use by an administrator of an organization that includes the user or (b) a public certificate authority, wherein the public certificate authority is a service of the cloud provider network or of a third-party.

* * * * *